United States Patent

Barnhart et al.

[11] Patent Number: 5,988,889
[45] Date of Patent: Nov. 23, 1999

[54] BEARING BORE CONSTRUCTION FOR FAN END BRACKET

[75] Inventors: Gary A. Barnhart, Newbury; James P. Shawcross, Hudson, both of Ohio

[73] Assignee: Ametek, Inc., Kent, Ohio

[21] Appl. No.: 09/074,426

[22] Filed: May 7, 1998

[51] Int. Cl.⁶ .................................................. F16C 17/00
[52] U.S. Cl. ........................................................ 384/441
[58] Field of Search .................................. 384/441, 428, 384/537, 584, 585

[56] References Cited

U.S. PATENT DOCUMENTS 5,475,275  12/1995  Dohogne et al. ...................... 384/441
5,607,241   3/1997  Fukumura ............................ 384/537

Primary Examiner—Lenard A. Footland
Attorney, Agent, or Firm—Renner, Kenner, Greive, Bobak, Taylor & Weber

[57] ABSTRACT

A motor fan bracket is molded of a fiber reinforced thermoset polyester. The motor/fan bracket has an annular frame and an annular bearing housing concentric with the frame and supported by inwardly extending arms. The annular bearing housing has a bearing-receiving cavity configured in cross section as an equilateral polygon such that each face of that cavity is tangential to a bearing received therein.

11 Claims, 1 Drawing Sheet

5,988,889

BEARING BORE CONSTRUCTION FOR FAN END BRACKET

TECHNICAL FIELD

The invention herein resides in the art of fan and motor assemblies. More particularly, the invention relates to a bearing bore within a fan end bracket for a motor/fan assembly. Specifically, the invention relates to such a bearing bore for use in molded reinforced thermoset brackets.

BACKGROUND ART

It is well known that in motor/fan assemblies, a motor/fan shaft is typically maintained within a bearing received within a bore in the fan end bracket. In the past, such fan end brackets have typically been of metal construction, formed by a stamping or metal die casting process. Similarly, the cup adapted for receiving the bearing has typically been pressed or stamped into a support member that traverses an end of the fan end bracket. Bearing-receiving cups or receptacles have typically been accurately formed by the press or stamping process. Accordingly, the bearing can be easily placed into its receptacle during the manufacturing and motor assembly process.

Recently, it has become desirable to form many of the structural components of motors from molded plastics. It has particularly become known to employ thermoset plastics for that purposes. However, shrinkage and the like which is experienced when a molded piece cools or is cured often results in distortion of various features on the molded part. Specifically, when using fiberglass reinforced thermoset polyester, it has been found that the bearing cup at the end of the fan end bracket is given to distortion during the cooling/curing process of the thermoset material unless great care is given in the manufacturing process. When the bore is made as a complete cylindrical bore, defined by a cylindrical wall, the bore often deforms to an elliptical or egg shape in cross section, rather than a circular configuration as is necessary for receiving the bearing. As a consequence, there is a high rejection rate of such molded fan end brackets, while even those which might be acceptable require significant reworking. Simply stated, the rejection rate or the rework rate of such molded fan end brackets has been found to be undesirably high. Moreover, with the wall of the bearing bore being designed to make total circumferential contact with the bearing, the necessary rework to attain that constant receipt is significant.

While the molding of fan end brackets and other motor/fan assembly parts from thermoset materials is highly desirable, the rejection or rework rate for such parts often negates the benefits achieved over the prior art metal stamped or die castparts. Notably, the primary area of concern with respect to the fan end bracket is that the bearing bore be sufficiently configured to nestingly receive the bearing during the manufacturing process. The other problems inherent with the plastic molding process have been less egregious.

In view of the foregoing, it is most desirable that a molded thermoplastic fan end bracket be devised that has either a uniformly formed bearing receptacle, or one which has minimal distortions which are easily reworked.

DISCLOSURE OF INVENTION

In light of the foregoing, it is a first aspect of the invention to present a bearing bore construction for a fan end bracket in which the fan end bracket is molded of fiberglass reinforced thermoset polyester.

Another aspect of the invention is the provision of a bearing bore construction for a fan end bracket which has a significantly reduced likelihood of distortion during the molding process as compared to prior art techniques and structures.

Still a further aspect of the invention is the provision of a bearing bore construction for a fan end bracket in which any distortions which might arise within the bore as a consequence of the molding process may be readily corrected.

Still a further aspect of the invention is the provision of a bearing bore construction for a fan end bracket in which the bore is shaped in the form of an equilateral polygon in cross section, rather than a circle.

Yet an additional aspect of the invention is the provision of a bearing bore construction for a fan end bracket which is reliable and durable in operation, increases production efficiencies, and is readily capable of implementation with state of the art apparatus and techniques.

The foregoing an other aspects of the invention which will become apparent as the detailed description proceeds are achieved by a motor/fan end bracket having a bearing cup, comprising: an annular frame; and an annular bearing housing maintained centrally of said annular frame, said annular bearing housing having a cup-shaped cavity defined by a multifaceted wall having an aperture at an end thereof.

Still further aspects of the invention which will become apparent herein are attained by a motor/fan bracket, comprising: an annular frame; an annular bearing housing concentric with said annular frame; support arms extending inwardly from said annular frame and securely maintaining said annular bearing housing, said annular frame, annular bearing housing and support arms being molded of a thermoset plastic; and wherein said annular bearing housing has a bearing-receiving cavity configured in cross section as an equilateral polygon, each face of said equilateral polygon being tangential to a common cylinder.

DESCRIPTION OF THE DRAWING

For a complete understanding of the objects, techniques and structure of the invention reference should be made to the following detailed description and accompanying drawing wherein.

BEST MODE FOR CARRYING OUT THE INVENTION

Figure 1:
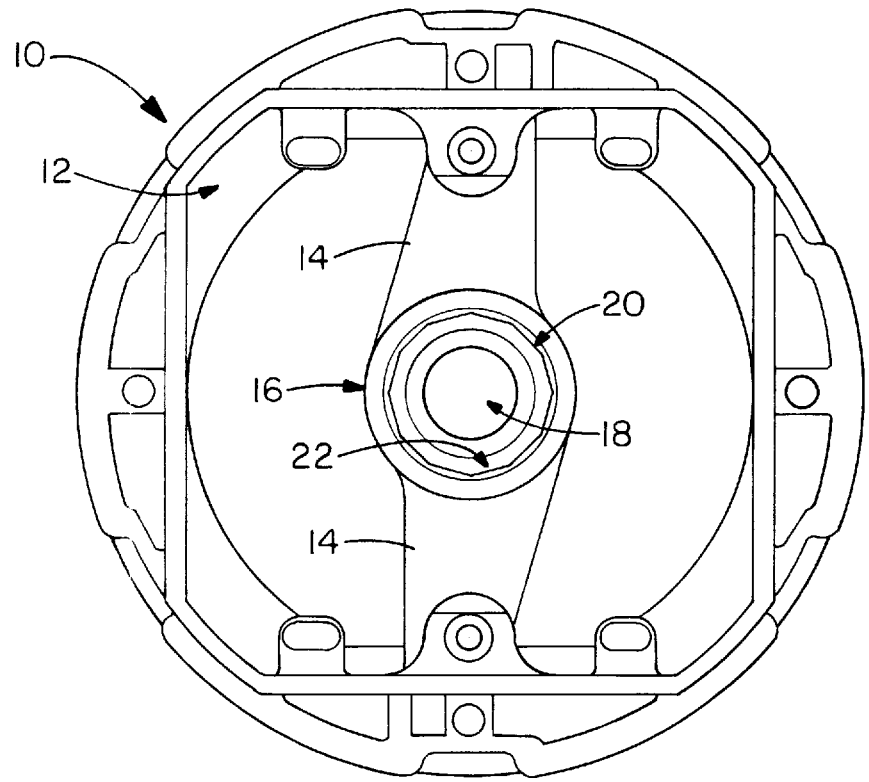
FIG. 1 is a plan view of the bottom of a fan end bracket made in accordance with the invention.

Referring now to the drawing and more particularly to FIG. 1, it can be seen that a fan end bracket made in accordance with the invention is designated generally by the numeral 10. It will be appreciated that the fan end bracket 10 as viewed from the bottom thereof is shown in FIG. 1. Those skilled in the art will readily appreciate that the fan end bracket 10 is adapted to mate with a motor housing and receive a fan shroud enclosing an appropriate fan of any desired structure. In accordance with the present invention, the fan end bracket 10 is molded of fiberglass reinforced thermoset polyester. However, the concept of the invention is intended to extend to any of a broad range of thermoset plastics.

As shown in FIG. 1, the fan end bracket 10 consists of an annular frame 12 having a pair of diametrically aligned support arms 14 extending therefrom and maintaining an annular bearing housing 16 concentric with the annular frame 12. Those skilled in the art will readily appreciate that the annular bearing housing 16 is intended to maintain a bearing which receives a fan and/or motor shaft. For this reason, the annular bearing housing 16 and the annular frame 12 are typically coaxially aligned.

Figure 2:
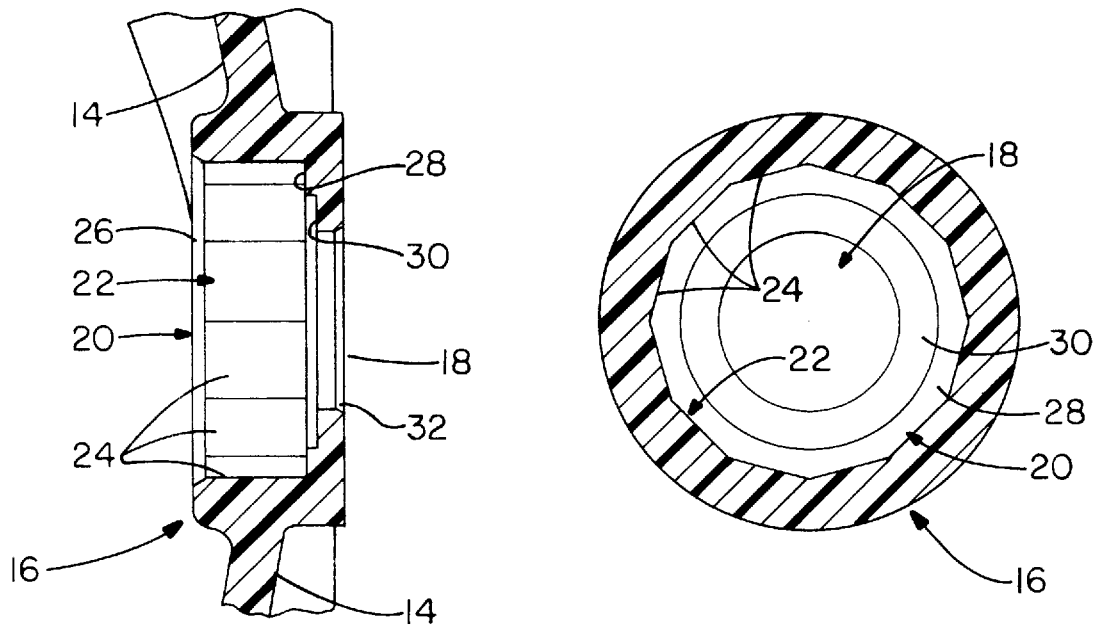
FIG. 2 is a cross sectional view of the bearing bore of the bracket of FIG. 1.

As best shown in FIG. 2, an aperture 18 is provided in an end wall of the annular bearing housing 16 for purposes of receiving a fan and/or motor shaft.

Figure 3:
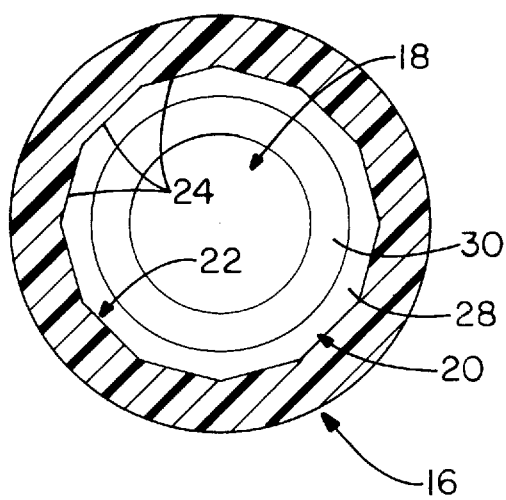
FIG. 3 is a cross sectional view of the bearing bore of FIG. 2 taken along the line orthogonal to that of FIG. 2.

As best shown in FIGS. 2 and 3, the annular bearing housing 16 includes a cup-shaped cavity 20 defined by multifaceted wall 22. The facets 24 of the wall 22 are molded to be of identical shape and configuration. In the preferred embodiment of the invention, the wall 22 is defined by 12 such facets, such that the wall or cavity 20, taken in cross section, defines a twelve sided equilateral polygon. With the polygon being equilateral, the axial centerline of each of the facets 24 lies on a common cylinder such than when a cylindrical bearing is placed within the cup-shaped cavity 20, it preferably tangentially engages each of the facets 24 at that centerline. Accordingly, there are twelve lines of tangential contact with the cylindrical bearing.

With reference now to FIGS. 2 and 3, it can be seen that a tapered or funnel shaped mouth 26 feeds into the cup-shaped cavity 20 at the major opening thereof. This tapered or funnel shaped mouth accommodates insertion of the cylindrical shaped bearing into the cavity 20. Moreover, with there being only twelve lines of contact between the bearing and the twelve facets 24, any irregularities within the facets may be somewhat easily accommodated as a bearing is pressed thereinto. Moreover, if the distortion of any of the facets 24 is such that the cavity 20 will not receive the bearing, only the distorted facets need to be reworked at the point of assembly. In other words, the cavity itself does not elongate or assume an elliptical or egg-shaped configuration, but remains substantially cylindrical in form, requiring only minor rework of selected facets.

With further reference to FIG. 2, it can be seen the bearing is adapted to rest upon an inner annular flange 28 and a recessed outer annular flange 30. These flanges, in conjunction with multifaceted wall 22, provide for nesting engagement of the bearing within the cavity so defined.

It will also be noted that the aperture 18, defined by the outer annular flange 30, also has a tapered funnel shaped mouth 32, sloped inwardly toward the aperture 18 for guidance and ease of placement of motor and/or fan shaft.

Those skilled in the art will readily appreciate that tuning and/or reworking of the cavity wall is greatly facilitated by the presence of a wall which is multifaceted, rather than one which is intended to be of a totally circular or cylindrical nature. Moreover, it has been found that any distortions resulting from the molding process are greatly reduced by employing the multifaceted wall feature. Those which do occur are easily reworked or otherwise corrected as a result of that same structure.

Those skilled in the art will readily appreciate that the number of facets 24 in the wall 22 may vary with design. In accordance with the preferred embodiment of the invention, at least eight such facets are desired for a typical motor/fan assemblies as used in vacuum devices and the like.

For the particular adaptation shown in the drawing, twelve such facets are employed. In general, the greater the number of facets, the smaller each facet is and, as a consequence, the more isolated any distortion will be and the easier it will be to correct.

Thus it can be seen that the objects of the invention have been satisfied by the structure presented above. While in accordance with the patent statutes only the best mode and preferred embodiment of the invention has been presented and described in detail, it will be understood that the invention is not limited thereto or thereby. Accordingly, for an appreciation of the true scope and breadth of the invention reference should be made to the following claims.

What is claimed is:

1. A motor/fan end bracket having a bearing cup, comprising:

an annular frame; and an annular bearing housing maintained centrally of said annular frame, said annular bearing housing having a cup-shaped cavity defined by a multifaceted wall having an aperture at an end thereof.

2. The motor/fan end bracket according to claim 1, wherein said multifaceted wall defines an equilateral polygon in cross section.

3. The motor/fan end bracket according to claim 2, further comprising a circular inwardly tapered lip defining a mouth of said cup-shaped cavity.

4. The motor/fan end bracket according to claim 3, wherein said annular bearing housing is formed of a thermoset polymer.

5. The motor/fan end bracket according to claim 4, wherein said multifaceted wall has at least eight facets.

6. The motor/fan end bracket according to claim 5, wherein said aperture at said end of said cup-shaped bore has an inwardly tapered lip about an outer edge thereof.

7. The motor/fan end bracket according to claim 5, wherein an axial center line of each facet of said multifaceted wall defines a common cylinder.

8. A motor/fan bracket, comprising:

an annular frame; an annular bearing housing concentric with said annular frame;

support arms extending inwardly from said annular frame and securedly maintaining said annular bearing housing, said annular frame, annular bearing housing and support arms being molded of a thermoset plastic; and wherein said annular bearing housing has a bearing-receiving cavity configured in cross section as an equilateral polygon, each face of said equilateral polygon being tangential to a common cylinder.

9. The motor/fan bracket according to claim 8, wherein said cavity has a mouth tapered inwardly.

10. The motor/fan bracket according to claim 9, wherein said thermoset plastic is reinforced polyester.

11. The motor/fan bracket according to claim 10, wherein said polygon has at least eight sides.

* * * * *